Figures 1, 2, 3, 4, 5:
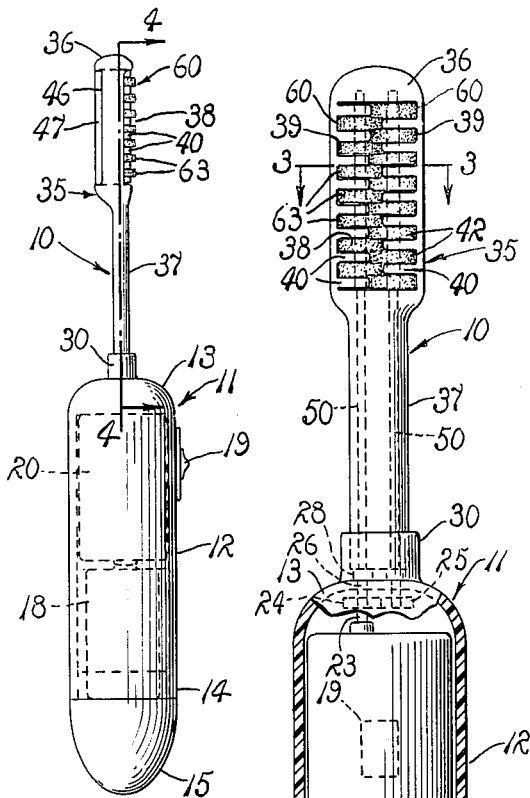

July 5, 1966  L. D. RODRIGUEZ  3,258,802
POWERED ORAL APPLIANCE
Filed Jan. 25, 1965

LOUIS D. RODRIGUEZ
INVENTOR

Huebner & Worrel
ATTORNEYS

United States Patent Office 3,258,802
Patented July 5, 1966

3,258,802
POWERED ORAL APPLIANCE
Louis D. Rodriguez, Visalia, Calif., assignor of fifty percent each to Joe L. Rodriguez and Georgia Rodriguez, Visalia, Calif.
Filed Jan. 25, 1965, Ser. No. 427,724
8 Claims. (Cl. 15—23)

The present invention relates to a powered oral appliance and more particularly to such an appliance having interchangeable rotary toothbrush and gum massaging elements which are easily cleaned without removal from the appliance and to such an appliance providing cooperative guard members which minimize accumulation of extraneous material on the toothbrush and gum massaging elements within the appliance.

Conventional power-driven rotary toothbrushes usually employ a brushing head having a pair of cylindrical brushes disposed therein in closely spaced side-by-side relation with the head being releasably mounted on a handle having a power unit therein. The brushes are usually rotated in opposite directions in order to sweep endwardly of the engaged teeth. The rotary toothbrushes provide a plurality of substantially radially extended bristles throughout their length. However, the bristles so densely populate the brush that extraneous materials, such as food particles and the like, frequently are tightly captured in wedging relation between the bristles within the brush. Such materials are difficult to remove by ordinary cleaning procedures and if permitted to remain, constitute an unsanitary condition and a hazard to good health. Frequently, food particles are carried by the densely bristled brushes into the brushing head where they are deposited behind the brushes. This requires that the brushes be completely removed from the head after every use of the toothbrush in order to remove such particles. As a result, conventional dual power-driven rotary toothbrushes have heretofore required more thorough cleaning procedures than the prior manual or power-driven brushes using single brushing heads and have not met with any appreciable commercial success. Furthermore the conventional powered toothbrushes have made no provision for utilizing an interchangeable gum massaging unit therewith.

Therefore, it is an object of the present invention to provide an improved powered oral appliance providing a rotary toothbrush and interchangeable gum massaging unit.

Another object is to provide such an improved powered oral appliance which may be easily and conveniently cleaned and maintained in a sanitary condition.

Another object is to provide a powered oral appliance of the character described which minimizes the accumulation of extraneous material therein.

Another object is to provide a powered oral appliance which permits cleaning of interior portions of the toothbrush and massaging units without removal from the appliance.

Another object is to provide such a powered oral appliance which is substantially self-cleaning.

Other objects and advantages of the present invention will become more clearly apparent upon reference to the following description in the specification and accompanying drawing.

In the drawing:
FIG. 1 is a side elevation of a powered oral appliance embodying the principles of the present invention providing a tooth brushing head.
FIG. 2 is a somewhat enlarged front elevation of the powered oral appliance of FIG. 1 with portions sectioned for illustrative convenience.
FIG. 3 is a somewhat enlarged transverse vertical section through the brushing head of the oral appliance taken on line 3—3 of FIG. 2.
FIG. 4 is a somewhat enlarged longitudinal section through the oral appliance taken on line 4—4 of FIG. 1 and foreshortened for illustrative convenience.
FIG. 5 is a sectional view similar to FIG. 3 but showing an alternative gum massaging unit having a plurality of resilient discs substituted for the brushes of the preceding figures.

Referring more particularly to the drawing, a powered oral appliance embodying the principles of the present invention is indicated by the reference numeral 10. The appliance includes a toothbrush unit 11 which is adapted to be releasably mounted on an elongated cylindrical handle 12. The handle includes a toothbrush mounting end 13 and an opposite open end 14 closable by a cap 15 screw-threadably received on the handle. A conventional battery indicated by the dashed lines at 18 is disposed within the handle which is connected by suitable wiring, not shown, through an external switch 19 to a motor 20 within the handle adjacent to the mounting end 12 thereof. A main drive shaft 23 is extended from the motor and is journaled in the mounting end 13 of the handle. The main drive shaft mounts a drive gear 24 which meshes with an identical gear 25 on a driven shaft 26 journaled in the mounting end of the handle in spaced parallel relation to the main drive shaft. Each of the shafts mounts a socket member 28 on its outer end which is disposed within a neck portion 30 of the handle of reduced diameter.

The toothbrush unit 11 provides an elongated tubular housing 35 having a somewhat enlarged head end 36 and an oppositely extended tube portion 37. The head end provides an elongated rectangularly shaped front opening 38 having opposite sides 39. A plurality of arcuate guards or fingers 40 are transversely inwardly extended from the opposite sides of the opening in transversely spaced rows, with the fingers in each row being disposed in longitudinal spaced relation defining a plurality of interstices 42 therebetween. The fingers of the opposite rows are further disposed in longitudinally staggered relation to each other and include inner ends 45 located in a position somewhat short of the longitudinal center line of the housing. An opposite back opening 46 is disposed in the housing and is closed by a cover plate 47 which is removable for ready access to the interior of the housing.

A pair of elongated shafts 50 are disposed within the housing 35 and are rotatably journaled in spaced bearing bores 54 in the head end 36 and in bearing bores 55 formed in a plug 56 disposed within the tube portion 37. The shafts further include flat sided, pointed drive ends 57 which are adapted to be received within the socket members 28 to form a driving connection between the shaft 23, 26 and 50. The tube portion 37 of the housing is of a size intimately to be received within the neck portion 30 of the handle and is constrained thereon by frictional engagement.

A pair of cylindrical brushes 60 are individually mounted on the ends of the shafts 50 within the head end 36 of the housing 35. The brushes include substantially circular brush elements 63 having bristles 64 radially extending from their respective shafts and with the individual brush elements disposed in axially spaced relation along their respective shafts within the interstices 42 between the fingers 40. Each of the brush elements provides outer peripheral portions 62 extended through the front opening 38 in the head end of the housing. Each of the brush elements has an inner periphery 66 which engages the inner ends 45 of the fingers of the opposite row of fingers within the front opening of the head. Consequently, the front opening of the housing is substantially closed by the rows of fingers and cooperating brush elements of the brushes.

As best seen shown in FIG. 5, a gum massaging unit, generally indicated by the reference numeral 70, is provided for alternative use with the toothbrush unit 11 of the present invention on the handle 12. The massaging unit utilizes the identical housing 35 of the toothbrush but substitute substantially circular massaging discs 72 on the shafts 50 for the brushing elements 63. The massaging discs are of substantially the same size as the brushing elements and preferably individually provide an undulating peripheral surface 74 having alternately arcuately curved depressions and protuberances 75 and 76, respectively. The discs are formed of a soft, pliable material such as rubber, soft plastic or the like so as to minimize abrading of gum tissue or other portions of the mouth. As with the toothbrush, the massaging discs combine with the finger 40 substantially to close the front opening 38 into the housing to minimize the ingress of extraneous material into the housing.

The operation of the described embodiments of the subject invention is believed to be clearly apparent and is briefly summarized at this point. As described, the tube portion 37 of the housing 35 is readily insertable and frictionally held by the neck portion 30 of the handle 12. During such assembly, the pointed drive ends 56 of the brush shafts 50 are received within their respective sockets 28 to connect the shafts with the handle drive shafts 23 and 26. Accordingly, a number of brushing heads of varied bristle strength may be inserted and removed with respect to the handle and may be employed by a number of users in a manner consistent with best sanitary practices.

After manipulation of the switch 19, the motor 20 is energized by its connection through the switch by the battery 18 to rotate the main drive shaft 23. Such drive is transmitted through the gears 24 and 25 to drive the brush shafts 50 in opposite directions so that the inner peripheries 66 of the brushing elements 63 move toward each other and in the same direction into the housing 35. During ordinary use with the brushes disposed adjacent to the teeth of the user, the contra-rotation of the brush elements insures that both the upper and lower teeth are brushed in a direction from the gums toward their crown portions in the manner recommended by dentists. Since the front opening 38 of the head end 36 of the housing is substantially closed by the brushing elements and fingers 40, the ingress of extraneous material is thereby substantially blocked. If any material is lodged between the bristles 64 of the brushing elements, such material is removed by the inner ends 45 of the fingers which engage the inner peripheries of the brushing elements. During rotation of the brushing elements, the bristles are flexed passed the fingers which tend to open the bristles and centrifugally discharge any material therebetween outwardly of the housing.

After use, the toothbrush unit 11 is easily cleaned without removing the brushes 60. This is accomplished by removing the cover plate 47 from the back opening 46 which permits the removal of any material which may inadvertently pass into the housing 35 between the brushes during operation. Furthermore, with the cover removed, the brush elements 63 are substantially completely exposed between the front and back openings to enable the free passage of water completely through the head end of the housing.

The massaging unit 70 of FIG. 5 may be easily substituted on the handle 12 for the toothbrush unit 11. In such position the massaging discs 72 are rotated in opposite directions in the same manner as the brushing elements 63 by the motor 20. The contra-rotating disc, like the brushing elements, individually engage the upper and lower gums of the user in a direction from their respective adjacent gum toward the teeth as desired. The inherent flexibility of the discs causes the arcuate protuberances 76 gently to knead and massage the gums to stimulate and maintain healthy gum tissue. Furthermore, the inner ends 45 of the arcuate fingers 40 engage the periphery 74 of their respectively adjacent discs to preclude any accumulation of extraneous material thereon and prevent its entry into the housing 35.

In view of the foregoing, it is readily apparent that the structure of the present invention has provided an improved powered oral appliance having interchangeable rotary toothbrush and gum massaging units which are maintained substantially free of accumulation of extraneous material. The structure of the present invention further permits substantially complete exposure of the brushes and massaging discs to facilitate their cleaning without removal from their respective housings. The toothbrush and massaging units are substantially self-cleaning during operation and are thereby capable of being maintained in a more sanitary condition than conventional power-driven mechanisms of this kind.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A powered oral appliance comprising a housing containing a power unit; a pair of elongated rotary members mounted in the housing individually providing a plurality of axially spaced radially extended elements, said rotary members being adapted to be mounted on the handle and having releasable connection to said power unit with the rotary members interconnected for contra-rotation on spaced substantially parallel axes; and means on the housing partially to enclose the rotary members providing a plurality of closure members individually transversely extended between said elements of the rotary members.

2. A powered oral appliance comprising an elongated housing having an opening therein adapted to be mounted on a handle containing a power unit, a pair of brushes, support means rotatably mounting said brushes in the housing for connection to said power unit upon assembly of said housing on the handle and interconnected for contra-rotation relative to each other on spaced substantially parallel axes, each of said brushes providing a plurality of axially spaced brush elements providing portions extended through said opening in the housing, and said housing providing a plurality of closure members individually transversely extended between said brush elements of the brushes in covering relation to said support means so that said brush elements and the closure members effectively block said opening in the housing.

3. A powered oral appliance comprising an elongated housing having an opening therein adapted to be mounted on a handle containing a power unit, a pair of brushes disposed in the housing, support means rotatably mounting the brushes on spaced substantially parallel axes and being connectable to said power unit upon assembly of said housing on the handle, means interconnecting the brushes for contra-rotation relative to each other, each of said brushes providing a plurality of axially spaced substantially circular brush elements providing peripheral portions extended through said opening in the housing, and said housing providing a plurality of closure members individually transversely extended between said brush elements of the brushes in covering relation to said support means so that said brush elements and the closure members effectively block said opening in the housing.

4. A powered oral appliance comprising an elongated housing having an end providing an opening into the housing and an opposite end adapted to be releasably mounted on a handle containing a power unit, a pair of elongated brushes disposed within the housing, a pair of shaft members journaled in the housing supporting the brushes on spaced substantially parallel axes and being connectable to said power unit upon assembly of said housing on the handle, means interconnecting the brushes for contra-rotation relative to each other, each of said brushes providing a plurality of axially spaced substantially circular brush elements radially extended from their respective shafts providing peripheral portions extended through said opening in the housing, and said housing providing a plurality of integral fingers individually extended between said brush elements of the brushes transversely of said axes thereof in covering relation to said shafts whereby said brush elements and the fingers effectively block said opening in the housing.

5. A powered oral appliance comprising an elongated housing having a head end providing an opening into the housing and an opposite mounting end adapted to be releasably mounted on a handle containing a power unit, a pair of elongated brushes, a pair of elongated shafts releasably journaled in the housing individually supporting the brushes therein on spaced substantially parallel axes with the shafts being connectable to said power unit upon assembly of said housing on the handle, means interconnecting the brushes for contra-rotation relative to each other, each of said brushes providing a plurality of axially spaced substantially circular brush elements radially extended from their respective shafts individually providing inner peripheral portions with the inner peripheral portions of the brush elements of one brush disposed in axially staggered transversely overlapped relation to the inner peripheral portions of the brush elements of the other brush and including outer peripheral portions extended through said opening in the housing, and said housing providing a plurality of integral fingers individually extended between said brush elements of the brushes transversely of said axes thereof in covering relation to their respective adjacent shafts whereby said brush elements and the fingers effectively block said opening in the housing.

6. A powered oral appliance comprising an elongated housing having a head end providing an opening into the housing and an opposite tubular mounting end adapted to be releasably mounted on a handle containing a power unit, a pair of elongated gum massaging members, a pair of elongated shafts releasably journaled in the housing individually supporting the massaging members therein on spaced substantially parallel axes with the shafts being connectable to said power unit upon assembly of said housing on the handle, means interconnecting the massaging members for contra-rotation relative to each other, each of said massaging members providing a plurality of axially spaced substantially circular massaging discs individually providing undulated peripheries having inner portions with the inner portions of the discs of one massaging member disposed in axially staggered transversely overlapped relation to the inner portions of the discs of the other massaging member and including outer peripheral portions extended through said opening in the housing, and said housing providing a plurality of integral fingers individually extended between said discs of the massaging members transversely of said axis thereof in covering relation to their respective adjacent shafts whereby said discs and the fingers effectively block said opening in the housing.

7. A powered oral appliance comprising an elongated housing having an opening therein, a pair of elongated rotary members mounted in the housing on spaced substantially parallel axes, a plurality of axially spaced elements radially extended from each of said rotary members through said opening outwardly of the housing, and means on the housing transversely extended between said elements of said rotary members in covering relation to the rotary members so as to combine with said elements for effectively closing said opening in the housing.

8. A powered oral appliance comprising an elongated housing having an opening therein, a pair of elongated rotary members mounted in the housing in spaced substantially parallel axes, a plurality of axially spaced substantially circular elements radially extended from each of said rotary members individually providing inner peripheral portions with the inner peripheral portions of the circular elements of one rotary member disposed in axially staggered transversely overlapped relation to the inner peripheral portions of the circular elements of the other rotary member and including outer peripheral portions extended through said opening in the housing, and a plurality of closure members integral with the housing transversely individually extended between said circular elements of the rotary members transversely of said axes thereof in covering relation to their respective adjacent rotary members whereby said circular elements and the closure members effectively block said opening in the housing.

References Cited by the Examiner

UNITED STATES PATENTS 3,015,833    1/1962    Gilet _____ 15—23

CHARLES A. WILLMUTH, *Primary Examiner.*

EDWARD L. ROBERTS, JR., *Assistant Examiner.*

UNITED STATES PATENT OFFICE
CERTIFICATE OF CORRECTION

Patent No. 3,258,802          Dated July 5, 1966

Inventor(s) Louis D. Rodriguez

It is certified that error appears in the above-identified patent and that said Letters Patent are hereby corrected as shown below:

In the heading to the printed specification, lines 3 and 4, "assignor of fifty percent each to Joe L. Rodriguez and Georgia Rodriguez, Visalia, Calif." should read -- assignor of fifty percent, to Joe L. Rodriguez and Georgia Rodriguez, Visalia, Calif. --.

Signed and sealed this 22nd day of February 1972.

(SEAL)
Attest:

EDWARD M. FLETCHER, JR.                    ROBERT GOTTSCHALK
Attesting Officer                          Commissioner of Patents